No. 698,657. Patented Apr. 29, 1902.
T. DUNCAN.
INDUCTION MOTOR METER.
(Application filed Sept. 18, 1899. Renewed Dec. 16, 1901.)

(No Model.)

Witnesses:

Inventor:
Thomas Duncan,
By Charles A. Brown & Cragg
Attorneys.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

INDUCTION MOTOR-METER.

SPECIFICATION forming part of Letters Patent No. 698,657, dated April 29, 1902.

Application filed September 18, 1899. Renewed December 16, 1901. Serial No. 86,064. (No model.)

*To all whom it may concern:*

Be it known that I, THOMAS DUNCAN, a citizen of the United States, residing at Chicago, in the county of Cook and State of Illinois, have invented a certain new and useful Improvement in Induction Motor-Meters, (Case No. 285,) of which the following is a full, clear, concise, and exact description, reference being had to the accompanying drawings, forming a part of this specification.

My invention relates to improvements in induction motor-meters, and has for its object the provision of an accurate, reliable, and convenient instrument for the measurement and indication of the magnetizing or lagging component of alternating-current systems.

My present invention is a modification and improvement of the meter set forth in my application, Serial No. 730,847, filed September 18, 1899, and, like the invention of the said application, is applicable both to integrating and indicating meters.

I do not consider it essential to explain in all details the construction of my meter, as my invention resides in the arrangement of the circuits and magnetizing field-windings, the application of which to meters of various kinds will be readily understood by those skilled in the art.

It is essential, as is well known, for the measurement of the lagging component of an alternating-current system to have an instrument which will be at rest or point to zero at the time when there is no inductive load in circuit—that is to say, when the current is in phase with the impressed electromotive force of the circuit. It is essential that the instrument should accurately indicate or measure the lagging component and should in its measurement or indication vary as the sine of the angle of lag. My present invention shows an improved means for securing this result, and I will explain the invention by reference to the accompanying drawings, in which—

Figure 1:
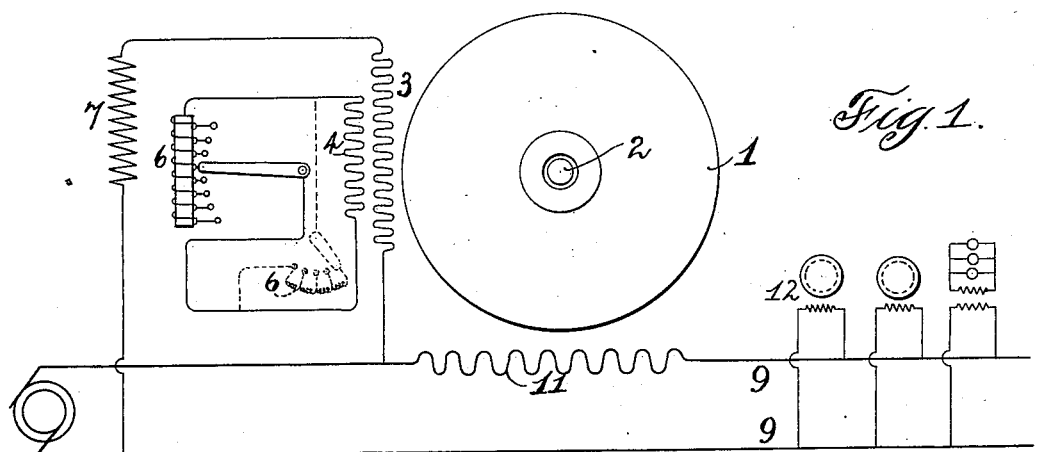
Figure 2:
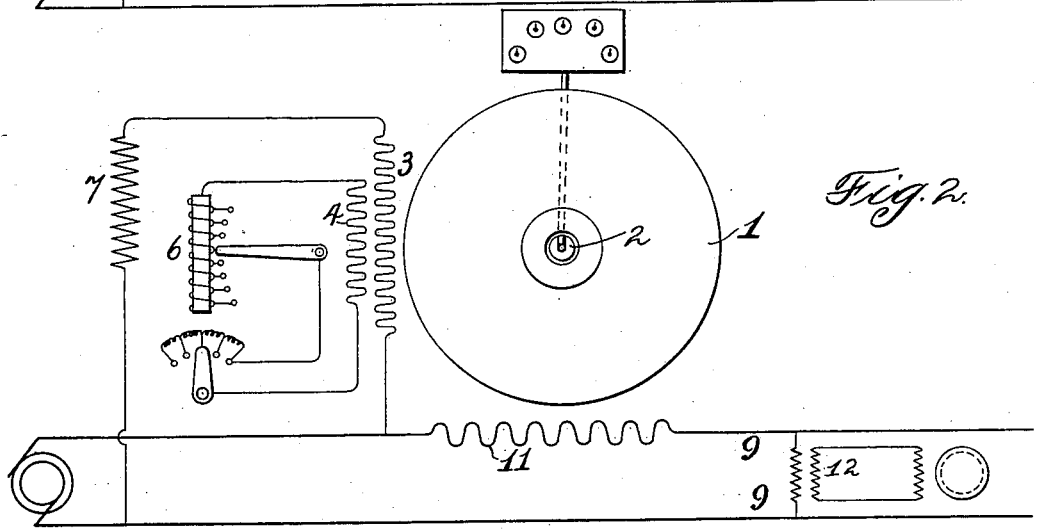
Figure 3:
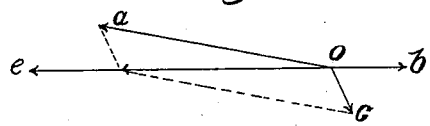

Figure 1 is a diagrammatic representation of the circuits and connections of the meter. Fig. 2 shows a modification of my invention, and Fig. 3 is a vector diagram illustrating the relations of the currents in the different circuits.

Similar characters of reference indicate similar parts in the different views.

The armature 1 may be of disk or cup shape and is pivoted upon a spindle 2, which may be connected to a registering-train for the purpose of integrating the measurement of the instrument. The current-winding 11 is connected in series in the main circuit 9 in the usual way. The shunt or pressure winding 3 is connected in shunt of the main leads 9 and 9, which is shown as supplying alternating current to the inductive load 12.

Assuming a non-inductive load as present in the system, in which case there will be no lagging in phase of current behind the impressed electromotive force, it is essential under these conditions that the current in the shunt-winding shall be in phase with the impressed electromotive force, so that no torque shall be exerted upon the armature 1. I accomplish this result by means of the shunt-winding 3, in series with which is the non-inductive resistance 7. By this circuit I get a current nearly in phase with the electromotive force of the main circuit, but necessarily lagging slightly on account of the inductance of the winding 3. Adjacent to this winding 3 I arrange a winding 4, which will get a current by induction from the winding 3. The induced electromotive force set up in coil 4 will be in the opposite direction one hundred and eighty degrees from the electromotive force of the main circuit. By the introduction of the adjustable impedance-coil 6 there will be introduced in this circuit a further lag of the current due to the induced electromotive force in the circuit including the winding 4. By adjusting this impedance-coil I am able to modify the phase of the current in this circuit, and consequently the magnetic effect of the winding 4, so that when it is combined with the magnetic effect of the winding 3 the resultant will be in phase with the impressed electromotive force of the main circuit.

The same arrangement of parts is shown in Fig. 2 as that of Fig. 1; but I have added to the adjustable impedance-coil in the secondary circuit including the winding 4 an adjustable resistance, which may be combined with the impedance-coil for the purpose of securing the necessary adjustment to maintain the combined magnetic effect of coils 3 and 4 in phase with the impressed electromotive force of the circuit. I also have shown in dotted lines in Fig. 1 still another arrangement by which this adjustment may be secured, which is an adjustable resistance 6, which may wholly take the place of the adjustable impedance-coil. The operation of this device will be readily understood by reference to Fig. 3, in which $o\,e$ represent the impressed electromotive force of the circuit; $o\,a$, the current in winding 3 as it would be independent of the effect of winding 4. $o\,b$ represent the secondary electromotive force in coil 4, which produces the current $o\,c$, lagging behind $o\,b$ on account of the impedance-coil 6.

From the foregoing it will be seen that the resultant magnetism of the two coils 3 and 4 will be in phase with the impressed electromotive force of the main circuit, and, as is well known to those skilled in the art, the introduction of the lagging current by means of an inductive load in the circuit will cause the current and pressure coils arranged as above described to exert upon the movable element 1 a torque varying as the sine of the angle of lag.

The details of this invention may be modified without departing from the spirit thereof. I do not wish, therefore, to be limited to the specific construction and arrangement of parts shown in all details; but, Having described my invention, what I claim as new, and desire to secure by Letters Patent, is—

1. In a device of the class described, the combination with an armature, of a series and a shunt winding in inductive relation therewith, a secondary circuit in inductive relation with said armature and also with said shunt-winding, and means for producing a resultant magnetism of said shunt-winding in phase with the impressed electromotive force of the circuit, substantially as described.

2. In a device of the class described, the combination with a movable element, of a series and a shunt winding in inductive relation therewith, a resistance-coil in series with said shunt-winding, a secondary circuit including a winding, and means for producing therein electromotive force whereby a magnetic field is produced in phase with the electromotive force of the main circuit, substantially as described.

3. In a device of the class described, the combination with a revoluble armature, of a series and a shunt winding in inductive relation therewith, a resistance-coil in series with said shunt-winding, a secondary circuit receiving current from the circuit including said shunt-winding, and means for producing and maintaining a magnetic field in phase with the impressed electromotive force of the main circuit, substantially as described.

4. In an induction motor-meter, the combination with a revoluble armature, of a series and a shunt winding in inductive relation therewith, a resistance-coil in series with said shunt-winding, a secondary circuit receiving current by induction from the circuit including said shunt-winding, and an impedance-coil in said secondary circuit whereby the phase of the magnetism of the shunt field-winding is maintained in phase with the impressed electromotive force of the circuit, substantially as described.

5. In a device of the class described, the combination with a movable element, of a series and a shunt winding in inductive relation therewith, a secondary circuit receiving current by induction from the circuit including the said shunt-winding, a winding in said secondary circuit also in inductive relation with said armature, and means for securing and maintaining the magnetism of said shunt field-winding in phase with the impressed electromotive force of the main circuit and for exerting upon the movable element a torque varying as the sine of the angle of lag of current of the main circuit behind its impressed electromotive force, substantially as described.

6. In an induction motor-meter, the combination with an armature, of a series and a shunt winding in inductive relation therewith, a resistance-coil in series with said shunt-winding, a secondary circuit receiving its current by induction, a winding included in said secondary circuit and in inductive relation with said shunt-winding, means for adjusting the phase of the current in said secondary circuit to bring the resultant magnetism of the pressure-winding into phase with the impressed electromotive force of the circuit, means for exerting upon the said armature a torque varying as the sine of the angle of lag of current behind the electromotive force, and means for indicating the variations of said torque, substantially as described.

7. The combination in an induction motor-meter, with a revoluble armature 1, of a series winding 11, the shunt-winding 3, the non-inductive resistance 7 in circuit with said shunt-winding 3, the secondary winding 4, whereby the field due to the pressure-winding is maintained in phase with the pressure, the adjustable impedance-coil 6, and the adjustable resistance 5 in series with said secondary winding 4, substantially as and for the purpose specified.

In witness whereof I hereunto subscribe my name this 13th day of September, A. D. 1899.

THOMAS DUNCAN.

Witnesses:
CHARLES A. BROWN,
GEORGE L. CRAGG.